US007877176B2

(12) United States Patent
Reeser et al.

(10) Patent No.: US 7,877,176 B2
(45) Date of Patent: Jan. 25, 2011

(54) METHOD AND SYSTEM FOR REMOTE TELLTALE RESET

(75) Inventors: Brad T. Reeser, Lake Orion, MI (US); Thomas A. Gawlik, Rochester Hills, MI (US); Russell A. Patenaude, Macomb Township, MI (US)

(73) Assignee: General Motors LLC, Detroit, MI (US)

( * ) Notice: Subject to any disclaimer, the term of this patent is extended or adjusted under 35 U.S.C. 154(b) by 1886 days.

(21) Appl. No.: 10/875,880

(22) Filed: Jun. 24, 2004

(65) Prior Publication Data

US 2005/0288830 A1 Dec. 29, 2005

(51) Int. Cl.
*G01M 15/04* (2006.01)
*G06F 17/40* (2006.01)

(52) U.S. Cl. ............................ 701/29; 701/30; 701/31; 701/33; 701/34; 340/539.24

(58) Field of Classification Search .................. 701/30, 701/31, 32
See application file for complete search history.

(56) References Cited

U.S. PATENT DOCUMENTS 5,442,553 A * 8/1995 Parrillo ....................... 455/420
6,087,930 A 7/2000 Kulka et al.
6,493,616 B1 * 12/2002 Rossow et al. ................ 701/29
6,564,126 B1 * 5/2003 Lin et al. ....................... 701/30
6,636,790 B1 * 10/2003 Lightner et al. ............... 701/33
6,735,503 B2 * 5/2004 Ames .......................... 701/29
7,096,101 B2 * 8/2006 Sonnenrein et al. ........... 701/29
7,397,363 B2 * 7/2008 Joao ...................... 340/539.11
7,548,491 B2 * 6/2009 Macfarlane ................. 367/198
2002/0103583 A1 * 8/2002 Ohmura et al. ............... 701/33
2002/0133273 A1 * 9/2002 Lowrey et al. ................ 701/29
2002/0177926 A1 * 11/2002 Lockwood et al. ............. 701/1
2003/0088347 A1 * 5/2003 Ames .......................... 701/33
2003/0098784 A1 * 5/2003 Van Bosch et al. ....... 340/425.5
2003/0114980 A1 * 6/2003 Klausner et al. ............ 701/207
2003/0210129 A1 * 11/2003 Aslund et al. ............. 340/5.31
2004/0008103 A1 * 1/2004 Kady et al. ................ 340/5.52
2004/0083041 A1 * 4/2004 Skeen et al. .................. 701/35
2004/0198466 A1 * 10/2004 Walby et al. ................ 455/574
2005/0060070 A1 * 3/2005 Kapolka et al. ............... 701/29

(Continued)

FOREIGN PATENT DOCUMENTS

CN 1141613 A 1/1997

(Continued)

OTHER PUBLICATIONS

Scottish Daily Record and Mail, Dail Record. May 1, 1998, "Webbed Feats", Bob Low, 1998.*

(Continued)

*Primary Examiner*—Thomas G Black
*Assistant Examiner*—Lin B Olsen
(74) *Attorney, Agent, or Firm*—Anthony Luke Simon; Reising Ethington P.C.

(57) ABSTRACT

A system and method for telltale reset from a remote processing center. A method includes receiving a telltale indication 200, establishing communication with the remote processing center through a telematics device 202, and resetting the telltale indication from the remote processing center through the telematics device 204.

21 Claims, 2 Drawing Sheets

U.S. PATENT DOCUMENTS

| | | | | |
|---|---|---|---|---|
| 2005/0068174 | A1* | 3/2005 | Oesterling et al. | 340/539.24 |
| 2005/0137763 | A1* | 6/2005 | Watkins et al. | 701/33 |

FOREIGN PATENT DOCUMENTS

| | | | |
|---|---|---|---|
| JP | 11223578 A | * | 8/1999 |

OTHER PUBLICATIONS

Luka, Jurgen and Stubhan, Frank, "Mobile Diagnosis" from IEEE IVEC '99, International Vehicle Electronics Conference, Sep. 1999, pp. 215-222.*

Patent Office of the People's Republic of China; First Office Action issued Sep. 21, 2007; patent application No. 200510082007.3; seven pages (translated).

* cited by examiner

METHOD AND SYSTEM FOR REMOTE TELLTALE RESET

FIELD OF THE INVENTION

The invention relates to vehicles, and more particularly to methods and systems for telltale reset from a remote processing center.

BACKGROUND OF THE INVENTION

With the increasing complexity of vehicle systems, telltale indication is ever more important to apprise the driver of vehicle condition. The telltale provides visual, text, and/or audible indication of off-normal vehicle conditions or scheduled vehicle maintenance. A telltale may also be invisible to a user or not be visible under normal operation. Examples of telltale indication include those indicating current vehicle condition, such as low battery indication, and those indicating more complex conditions calculated from vehicle operating history, such as oil life. Another example of a telltale includes a Diagnostic Trouble Code (DTC).

The increasing importance of the telltale indication adds to the annoyance and anxiety of the driver when telltale indications alarm. The annoyance compounds when the telltale indication fails to reset. False indication can lead the driver to disregard the telltale indication, potentially resulting in vehicle damage.

Presently, certain telltale indications are manually reset by the service personnel after vehicle maintenance. For example, oil life indication is manually reset after an oil change. The manual reset procedure is often complex, requiring a series of steps, such as placing the ignition key in a particular position and pumping the accelerator pedal a set number of times within a given time period, then observing that the telltale indication blinks. Such complicated and time consuming procedures may be skipped by the home mechanic or forgotten by service personnel. Should the service personnel fail to perform the reset, the driver is left wondering whether the required service was actually performed, and must follow up with the service facility.

Other telltale indications reset automatically, but require a predetermined operating period in a normal operating condition before reset. For example, an improper tire inflation indication requires the vehicle be driven a number of miles after the tire pressure is changed before the improper tire inflation indication resets. The driver is left without indication for those miles until the improper tire inflation indication resets. If the tire is under-inflated or over-inflated, the driver has no indication of the improper inflation other than noticing that the improper tire inflation indication has not reset after a number of miles. The driver may disregard the indication as faulty, resulting in tire or vehicle damage.

It would be desirable to have a method and system for telltale reset from a remote processing center that overcomes the above disadvantages.

SUMMARY OF THE INVENTION

The present invention provides a method for telltale reset from a remote processing center including receiving a telltale indication, establishing communication with the remote processing center through a telematics device, and resetting the telltale indication from the remote processing center through the telematics device.

Another aspect of the invention provides a system for resetting a telltale from a remote processing center, including means for receiving a telltale indication, means for establishing communication with the remote processing center through a telematics device, and means for resetting the telltale indication from the remote processing center through the telematics device.

Yet another aspect of the invention provides a computer readable medium for resetting a telltale from a remote processing center, including computer readable code for receiving a telltale indication, computer readable code for establishing communication with the remote processing center through a telematics device, and computer readable code for resetting the telltale indication from the remote processing center through the telematics device.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Figure 1:
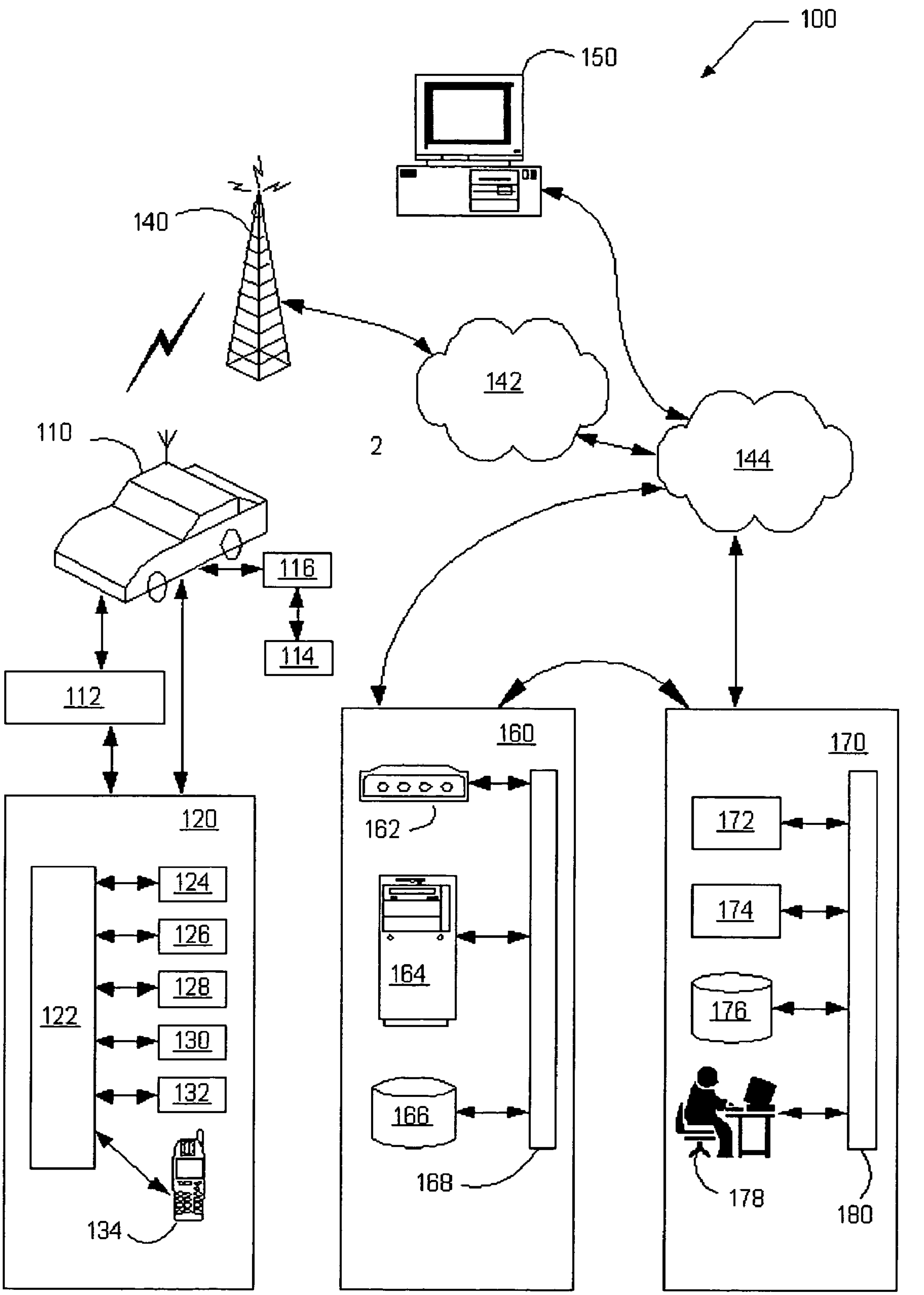
FIG. 1 is an illustrative operating environment for telltale reset from a remote processing center in accordance with one embodiment of the present invention.

FIG. 1 is an illustrative operating environment for telltale reset from a remote processing center in accordance with one embodiment of the present invention. FIG. 1 shows a mobile vehicle communication system 100. Mobile communication system 100 includes at least one mobile vehicle 110 (vehicle) including vehicle communication network 112 and telematics device 120; one or more wireless carrier systems 140; one or more communication networks 142; one or more land networks 144; one or more client, personal or user computers 150; one or more web-hosting portals 160; and one or more call centers 170. The mobile vehicle 110 includes at least one telltale 114 operably connected to telltale indication logic 116, which is in communication with the telematics device 120. In one embodiment, mobile vehicle 110 is implemented as a vehicle equipped with suitable hardware and software for transmitting and receiving voice and data communications. The telematics device 120 is also called a vehicle communications unit (VCU) or a telematics unit.

In one embodiment, the telematics device 120 includes a digital signal processor (DSP) 122 connected to a wireless modem 124, a global positioning system (GPS) unit 126, an in-vehicle memory 128 such as, for example, a non-volatile flash memory, a microphone 130, one or more speakers 132, and an embedded or in-vehicle mobile phone 134. In one embodiment, DSP 122 is a microcontroller, controller, host processor, or vehicle communications processor. In an example, DSP 122 is implemented as an application specific integrated circuit (ASIC). GPS unit 126 provides longitude and latitude coordinates of the vehicle, as well as a time and date stamp. In-vehicle mobile telephone system 134 is a cellular-type phone such as, for example, an analog, digital, dual-mode, dual-band, multi-mode, or multi-band cellular phone. In another example, the mobile telephone system is an analog mobile telephone system operating over a prescribed band nominally at 800 MHz. In another example, the mobile telephone system is a digital mobile telephone system operating over a prescribed band nominally at 800 MHz, 900 MHz, 1900 MHz, or any suitable band capable of carrying digital cellular communications.

DSP 122 executes various computer programs and communication control and protocol algorithms that affect communication, programming, and operational modes of electronic and mechanical systems within vehicle 110. In one embodiment, DSP 122 is an embedded system controller. In another embodiment, DSP 122 controls communications between telematics device 120, wireless carrier system 140, and call center 170. In yet another embodiment, DSP 122 controls communications between the wireless modem 124 and nodes of a mobile ad hoc network. In still another embodiment, DSP 122 provides processing, analysis, and control functions for determining engine emission performance for vehicle 110. DSP 122 is configured to generate and receive digital signals transmitted between telematics device 120 and a vehicle communication network 112 that is connected to various electronic modules in the vehicle 110. In one embodiment, the digital signals activate a programming mode and operation modes, as well as provide for data transfers. In another embodiment, a utility program facilitates the transfer of emission data, emission analysis data, instructions, triggers, and data requests between vehicle 110 and a call center 170.

Mobile vehicle 110, via a vehicle communication network 112, sends signals to various units of equipment and systems within vehicle 110 to perform various functions such as monitoring the operational state of vehicle systems, collecting and storing data from the vehicle systems, providing instructions, data and programs to various vehicle systems, and calling from telematics device 120. In facilitating interactions among the various communication and electronic modules, vehicle communication network 112 utilizes interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Vehicle 110, via telematics device 120, sends and receives radio transmissions from wireless carrier system 140. Wireless carrier system 140 is implemented as any suitable system for transmitting a signal from mobile vehicle 110 to communication network 142. Wireless carrier system 140 incorporates any type of telecommunications in which electromagnetic waves carry signal over part of or the entire communication path. In one embodiment, wireless carrier system 140 transmits analog audio and/or video signals. In an example, wireless carrier system 140 transmits analog audio and/or video signals such as those sent from AM and FM radio stations and transmitters, or digital audio signals in the S band (approved for use in the U.S.) and L band (used in Europe and Canada). In one embodiment, wireless carrier system 140 is a satellite broadcast system broadcasting over a spectrum in the S band (2.3 GHz) that has been allocated by the U.S. Federal Communications Commission (FCC) for nationwide broadcasting of satellite-based Digital Audio Radio Service (DARS).

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to mobile vehicle 110 and land network 144. In one example, wireless carrier system 140 includes a short message service, modeled after established protocols such as IS-637 SMS standards, IS-136 air interface standards for SMS, and GSM 03.40 and 09.02 standards. Similar to paging, an SMS communication could be broadcast to a number of regional recipients. In another example, the carrier system 140 uses services in accordance with other standards such as, for example, IEEE 802.11 compliant wireless systems and Bluetooth compliant wireless systems.

Land network 144 is a public-switched telephone network (PSTN). In one embodiment, land network 144 is implemented as an Internet protocol (IP) network. In other embodiments, land network 144 is implemented as a wired network, an optical network, a fiber network, another wireless network, a virtual private network (VPN), or any combination thereof. Land network 144 is connected to one or more landline telephones. Land network 144 connects communication network 142 to computer 150, web-hosting portal 160, and call center 170. Communication network 142 and land network 144 connect wireless carrier system 140 to web-hosting portal 160 and call center 170.

Client, personal, or user computer 150 includes a computer usable medium to execute Internet-browser and Internet-access computer programs for sending and receiving data over land network 144 and, optionally, wired or wireless communication networks 142 to web-hosting portal 160 and vehicle 110. Computer 150 sends data to web-hosting portal through a web-page interface using communication standards such as hypertext transport protocol (HTTP) and transport-control protocol Internet protocol (TCP/IP). In one embodiment, the data includes directives to change certain programming and operational modes of electronic and mechanical systems within vehicle 110. In another embodiment, the data includes requests for certain data such as vehicle system performance information. In operation, a user, such as, for example, a vehicle designer or manufacturing engineer, utilizes computer 150 to exchange information with mobile vehicle 110 that is cached or stored in web-hosting portal 160. In an embodiment, vehicle system performance information from client-side software is transmitted to server-side software of web-hosting portal 160. In one embodiment, vehicle system performance information is stored at web-hosting portal 160. In another embodiment, computer 150 includes a database (not shown) for storing received vehicle system performance data. In yet another embodiment, a private Local Area Network (LAN) is implemented for client computer 150 and web-hosting portal 160, such that web-hosting portal is operated as a Virtual Private Network (VPN).

Web-hosting portal 160 includes one or more data modems 162, one or more web servers 164, one or more databases 166, and a network 168. Web-hosting portal 160 is connected directly by wire to call center 170, or connected by phone lines to land network 144, which is connected to call center 170. Web-hosting portal 160 is connected to land network 144 by one or more data modems 162. Land network 144 transmits digital data to and from modem 162; data that is subsequently transferred to web server 164. In one implementation, modem 162 resides inside web server 164. Land network 144 transmits data communications between web-hosting portal 160 and call center 170.

Web server 164 receives various data, requests, or instructions from computer 150 via land network 144. In alternative embodiments, computer 150 includes a wireless modem to send data to web-hosting portal 160 through a wireless communication network 142 and a land network 144. Data is received by modem 162 and sent to one or more web servers 164. In one embodiment, web server 164 is implemented as any suitable hardware and software capable of providing web services to transmit and receive data from computer 150 to telematics device 120 in vehicle 110. Web server 164 sends to or receives data transmissions from one or more databases 166 via network 168. In an embodiment, web server 164 includes computer applications and files for managing emission performance data.

In one embodiment, one or more web servers 164 are networked via network 168 to distribute vehicle engine emission performance data among its network components such as database 166. In an example, database 166 is a part of or a separate computer from web server 164. In one embodiment, web-server 164 sends data transmissions including vehicle system performance information to call center 170 via modem 162, and through land network 144.

Call center 170 is a location where many calls are received and serviced at the same time, or where many calls are sent at the same time. In one embodiment, the call center is a telematics call center, facilitating communications to and from telematics device 120 in vehicle 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more networks 180.

Switch 172 of call center 170 connects to land network 144. Switch 172 transmits voice or data transmissions from call center 170, and receives voice or data transmissions from telematics device 120 in mobile vehicle 110 through wireless carrier system 140 and/or wireless modem 124, communication network 142, and land network 144. Switch 172 receives data transmissions from and sends data transmissions to one or more web-hosting portals 160. Switch 172 receives data transmissions from or sends data transmissions to one or more communication services managers 174 via one or more networks 180.

Communication services manager 174 is any suitable hardware and software capable of providing communication services to telematics device 120 in mobile vehicle 110. Communication services manager 174 sends to or receives data transmissions from one or more communication services databases 176 via network 180. Communication services manager 174 sends to or receives data transmissions from one or more communication services advisors 178 via network 180. Communication services database 176 sends to or receives data transmissions from communication services advisor 178 via network 180. Communication services advisor 178 receives from or sends voice or data transmissions to switch 172.

Communication services manager 174 facilitates one or more services, such as, but not limited to, enrollment services, navigation assistance, directory assistance, roadside assistance, business or residential assistance, information services assistance, emergency assistance, communications assistance, and telematics retrieval of vehicle system performance information. Communication services manager 174 transmits and receives operational status, instructions, and other types of vehicle data to telematics device 120 in mobile vehicle 110 through wireless carrier system 140, communication network 142, land network 144, wireless modem 124, voice and data switch 172, and network 180. Communication services manager 174 stores or retrieves vehicle system performance information from communication services database 176. Communication services manager 174 provides requested information to communication services advisor 178.

In one embodiment, communication services advisor 178 is a real advisor. In another embodiment, communication services advisor 178 is implemented as a virtual advisor. In an example, a real advisor is a human being at a service provider service center in verbal communication with a service subscriber in mobile vehicle 110 via telematics device 120. In another example, a virtual advisor is implemented as a synthesized voice interface responding to requests from telematics device 120 in mobile vehicle 110.

Communication services advisor 178 provides services to telematics device 120 in mobile vehicle 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics device 120 in mobile vehicle 110 through wireless carrier system 140, communication network 142, and land network 144 using voice transmissions, or through communication services manager 174 and switch 172 using data transmissions. Switch 172 selects between voice transmissions and data transmissions.

Mobile vehicle 110 initiates service requests to call center 170 by sending a voice or digital-signal command to telematics device 120, which, in turn, sends an instructional signal or a voice call through wireless modem 124, wireless carrier system 140, communication network 142, and land network 144 to call center 170. In one embodiment, one or more triggers stored in the telematics device 120 cause the vehicle to initiate a service request. The trigger is, for example, a number of ignition cycles, a specific time and date, an expired time, a number of kilometers, an absolute Global Positioning System (GPS) timestamp, a request vehicle emission performance data and the like.

The mobile vehicle 110 includes at least one telltale 114 providing indication to the driver of off-normal vehicle conditions or desirable vehicle maintenance. Examples of conditions that can be indicated by the telltale 114 are tire pressure, oil life, engine condition, battery charge, brake wear, downloaded data set or the like. In another embodiment, a downloaded data set is, for example, an odometer setting, a route to a destination, or a program for a vehicle subsystem. In another example, the trigger is activated by a user, such as with a button push or request to the call center. Engine condition includes, in one embodiment, the existence of a DTC, and historical DTCs. The telltale 114 is operably connected to telltale indication logic 116, which is in communication with the telematics device 120 for sending information over the mobile vehicle communication system 100. The telltale indication logic 116 is also operably connected to vehicle sensors or electronics (not shown) which monitor the condition of the mobile vehicle 110. The telltale indication logic 116 processes the vehicle sensors or electronics input to set the state of the telltale 114. The telltale 114 provides visual, text, and/or audible indication to the driver. In one embodiment, the telltale 114 is a lamp with a legend, such as Change Engine Oil, on the dash of the mobile vehicle 110. In an alternative embodiment, the telltale 114 is an audible signal from the speakers 132. In another alternative embodiment, the telltale 114 is text or graphics on a video display unit in the mobile vehicle 110 indicating a normal or off-normal state, and/or the value of the condition being monitored.

Figure 2:
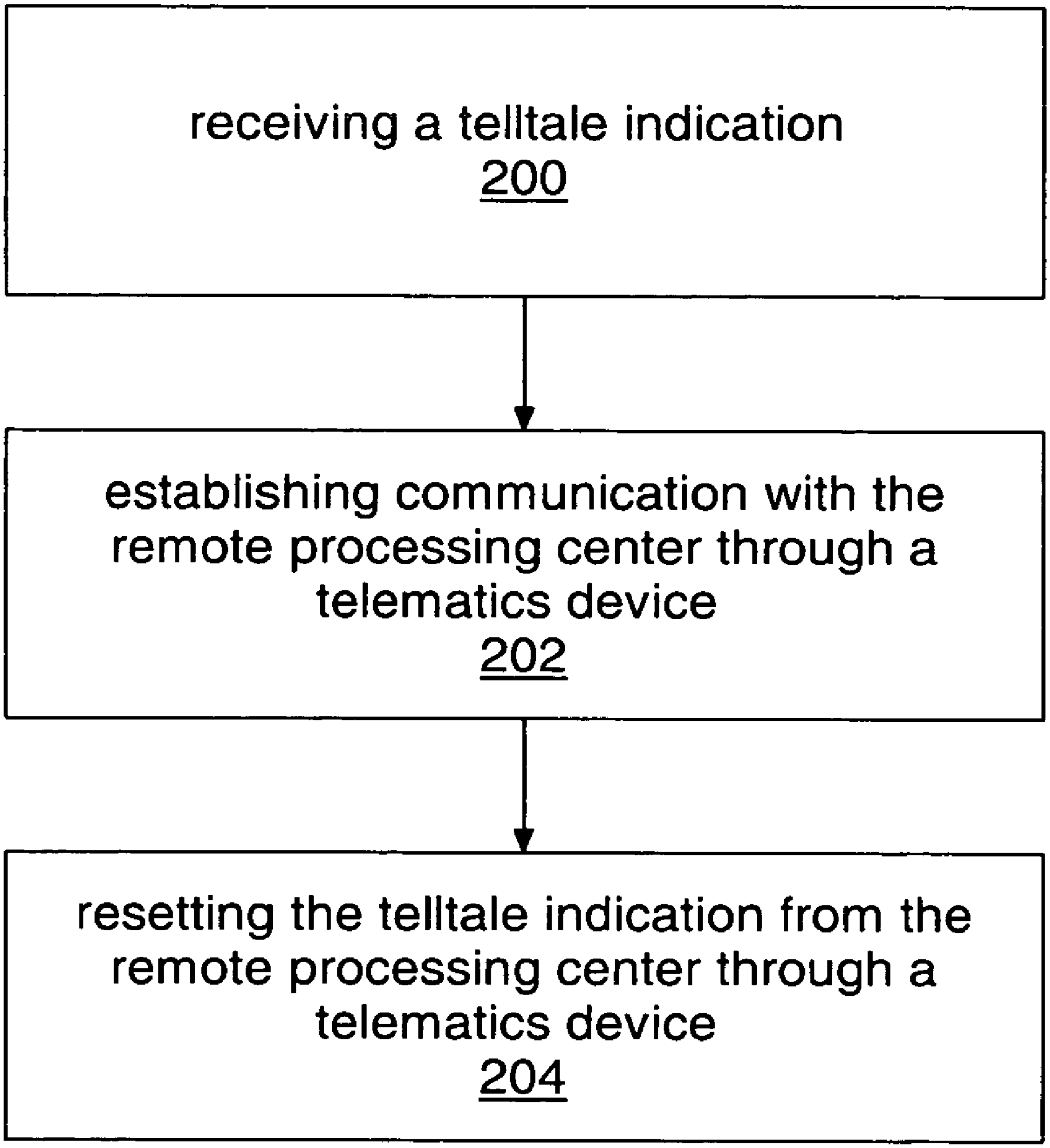
FIG. 2 is a flow diagram of a method for telltale reset from a remote processing center in accordance with one embodiment of the present invention.

FIG. 2 is a flow diagram of a method for telltale reset from a remote processing center through a mobile vehicle communication system in accordance with one embodiment of the present invention. The method includes receiving a telltale indication 200, establishing communication with the remote processing center through a telematics device 202, and resetting the telltale indication from the remote processing center through the telematics device 204. The method operates within an environment and using a system such as the exemplary system of FIG. 1. The method is embodied in a computer usable medium for remote resetting of the telltale indication including computer readable code for executing the method described by FIG. 2.

Receiving a telltale indication 200 includes receiving telltale indication of any mobile vehicle condition monitored by the telltale indication logic. In one embodiment, the condition is selected from tire pressure, oil life, engine condition, battery charge, interior lights, vehicle fluid levels, exterior lights, brake wear, and the like. In one embodiment, vehicle fluid levels include the level of fluids, such as transmission fluid, wiper fluid, brake fluid, power steering fluid, radiator fluid, coolant, and freon or other gases. Examples of interior lights include dome lights, overhead console lights, as well as "fasten seat belt" lights, airbag lights, door ajar lights, loss of GPS or cellular signal lights, or other visual indicators displayed on a dashboard. In one embodiment, the telltale indication indicates an off-normal condition, such as Low Tire Pressure, for example. In an alternative embodiment, the telltale indication indicates that desirable or required maintenance is due. One example of maintenance telltale indication is a Change Engine Oil indication based on calculated oil life.

Establishing communication with the remote processing center through a telematics device 202 includes establishing communication between the mobile vehicle and the remote processing center. Communication is established manually or automatically. In one embodiment, the communication is established from the vehicle to the remote processing center. In an alternative embodiment, the communication is established from the remote processing center to the vehicle. The remote processing center is any facility remote from the mobile vehicle, such as the call center, the web-hosting portal, or the like, able to communicate data, information, and/or instructions with the telematics device over the wireless vehicle communication center.

To establish communication manually from the vehicle to the remote processing center, the driver actuates the telematics device to contact the remote processing center. To establish communication automatically from the vehicle to the remote processing center, the telematics device receives an indication signal signifying a telltale indication from the telltale indication logic and contacts the remote processing center. In one embodiment, the communication services advisor at the call center can communicate with the driver.

The communication that is established from the vehicle to the remote processing center and used to transmit the indicator signal can also be used by the remote processing center to reset the telltale indication. Alternatively, the reset can be carried out during a subsequent communication established from the remote processing center to the vehicle. In this approach, the telltale indication logic first sends an indication signal signifying a telltale indication to the telematics device, which forwards the indication signal to the remote processing center. If desired, the telematics device also forwards information such as vehicle location and operating parameters to the remote processing center. The remote processing center then establishes communication with the vehicle. In one embodiment, the communication services advisor at the call center manually contacts the vehicle. In an alternative embodiment, the communication services advisor at the call center or the web-hosting portal automatically contacts the vehicle in response to the indication signal signifying a telltale indication.

In one embodiment, the telematics device and the remote processing center, such as the call center or web-hosting portal, communicate over the wireless carrier system through the communication network and the land network. Once communication is established, information such as vehicle location and operating parameters can be transferred to the remote processing center.

Resetting the telltale indication from the remote processing center through the telematics device 204 includes manual or automatic reset of the telltale indication from the remote processing center, such as the call center or web-hosting portal. The remote processing center sends a reset signal over the mobile vehicle communication system to the telematics device, which forwards the reset signal to the telltale indication logic, which resets the telltale indication.

In one embodiment, resetting the telltale indication from the remote processing center through the telematics device 204 includes checking vehicle data at the remote processing center and resetting the telltale indication when the vehicle data is normal. The vehicle data can be any data relevant to checking the telltale indication, such as prior vehicle data obtained during prior vehicle operation, service vehicle data obtained at the service facility during earlier vehicle maintenance, and current vehicle data obtained during the current communication between the vehicle and the remote processing center following the telltale indication. The vehicle data can include information provided by the driver. The remote processing center can receive the vehicle data from any server throughout the mobile vehicle communication system where data is stored, such as servers in the call center, web-hosting portal, or the like.

The definition of normal for the vehicle data depends on the particular condition indicated by the telltale. In one embodiment, the definition of normal includes considerations of the likelihood of vehicle failure and the consequences of such failure. For example, a Change Engine Oil indication is unlikely to result in immediate engine damage, so normal is defined as a broad range of values. In contrast, a Check Engine indication can indicate potential catastrophic failure, so normal is defined as a narrow range of values.

In an alternative embodiment, resetting the telltale indication from the remote processing center through the telematics device 204 comprises scheduling a service appointment date and resetting the telltale indication. A service appointment, in an embodiment, includes collecting DTC codes as well as any data associated with any existing DTC codes. The communication between the vehicle and the remote processing center in response to the telltale indication provides a convenient opportunity for the driver to make a service appointment date with a service facility to attend to the condition indicated by the telltale or for other service. For example, the driver may desire to make an oil change appointment when in communication with the remote processing center about a Change Engine Oil indication. The remote processing center resets the telltale indication through the telematics device when the service appointment date is scheduled. In one embodiment, vehicle data is checked after the service appointment date, such as checking the vehicle data to assure that the service scheduled for the service appointment date was performed. In an alternative embodiment, the remote processing center can initiate a telltale indication or alarm at the vehicle through the telematics device if the vehicle data is inconsistent with the service scheduled for the service appointment date. For example, if the oil life condition is still high although an oil change was scheduled.

In one embodiment, the method for resetting a telltale from a remote processing center further includes performing vehicle service in response to the telltale indication. The vehicle service can be performed before or after establishing communication with the remote processing center through a telematics device 202. In one embodiment, the vehicle service is performed before the telltale indication is remotely reset. The driver or service personnel can request the telltale reset through the telematics device. In an alternative embodiment, the vehicle service is performed after the telltale indication is remotely reset.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

What is claimed is:

1. A method for resetting a telltale from a remote processing center, the method comprising:
- providing a telltale indication to a vehicle operator within the vehicle;
- receiving at a telematics device in the vehicle an indication signal signifying the telltale indication;
- sending the indication signal to a remote processing center having an advisor that interprets and responds to voice requests that are received by the advisor from different vehicle operators;
- establishing communication between the vehicle operator and the advisor at the remote processing center; and thereafter
- resetting the telltale indication from the remote processing center through the telematics device based on a determination of the advisor.

2. The method of claim 1 wherein the telltale indication indicates a condition selected from the group consisting of tire pressure, oil life, engine condition, battery charge, a downloaded data set, interior lights, vehicle fluid levels, exterior lights, and brake wear.

3. The method of claim 1 wherein the establishing communication between the vehicle operator and an advisor comprises one of establishing communication from the vehicle to the remote processing center and establishing communication from the remote processing center to the vehicle.

4. The method of claim 1 wherein the resetting the telltale indication from the remote processing center through the telematics device comprises checking vehicle data at the remote processing center and resetting the telltale indication when the vehicle data is normal.

5. The method of claim 4 wherein the vehicle data is selected from the group consisting of prior vehicle data, service vehicle data, and current vehicle data.

6. The method of claim 1 wherein the resetting the telltale indication from the remote processing center through the telematics device comprises scheduling a service appointment date and resetting the telltale indication when the service appointment date is scheduled.

7. The method of claim 6 wherein the service appointment includes collecting DTC codes and any data associated with the DTC codes.

8. A method for resetting a telltale from a remote processing center, the method comprising:
- providing a telltale indication to a vehicle operator within the vehicle;
- receiving at a telematics device in the vehicle an indication signal signifying the telltale indication;
- sending the indication signal to a remote processing center;
- establishing communication between the vehicle operator and an advisor at the remote processing center; and thereafter
- resetting the telltale indication from the remote processing center through the telematics device, wherein the resetting the telltale indication from the remote processing center through the telematics device comprises scheduling a service appointment date, resetting the telltale indication when the service appointment date is scheduled, and checking vehicle data after the service appointment date.

9. The method of claim 1 further comprising performing vehicle service in response to the telltale indication.

10. A system for resetting a telltale from a remote processing center, the system comprising:
- means for providing a telltale indication to a vehicle operator within the vehicle;
- means for receiving at a telematics device in the vehicle an indication signal signifying the telltale indication;
- means for sending the indication signal to a remote processing center having an advisor that interprets and responds to voice requests that are received by the advisor from different vehicle operators;
- means for establishing communication between the vehicle operator and the advisor at the remote processing center; and
- means for thereafter resetting the telltale indication from the remote processing center through the telematics device based on a determination of the advisor.

11. The system of claim 10 wherein the means for establishing communication between the vehicle operator and an advisor comprises one of means for establishing communication from the vehicle to the remote processing center and means for establishing communication from the remote processing center to the vehicle.

12. The system of claim 10 wherein the means for resetting the telltale indication from the remote processing center through the telematics device comprises means for checking vehicle data at the remote processing center and means for resetting the telltale indication when the vehicle data is normal.

13. The system of claim 10 wherein the means for resetting the telltale indication from the remote processing center through the telematics device comprises means for scheduling a service appointment date and means for resetting the telltale indication.

14. A system for resetting a telltale from a remote processing center, the system comprising:
- means for providing a telltale indication to a vehicle operator within the vehicle;
- means for receiving at a telematics device in the vehicle an indication signal signifying the telltale indication;
- means for sending the indication signal to a remote processing center;
- means for establishing communication between the vehicle operator and an advisor at the remote processing center; and
- means for thereafter resetting the telltale indication from the remote processing center through the telematics device, wherein the means for resetting the telltale indication from the remote processing center through the telematics device comprises means for scheduling a service appointment date, means for resetting the telltale indication, and means for checking vehicle data after the service appointment date.

15. The system of claim 14 further comprising means for initiating an alarm from the remote processing center when the vehicle data is inconsistent with service scheduled for the service appointment date.

16. A computer readable medium for resetting a telltale from a remote processing center, the computer readable medium comprising:

computer readable code for providing a telltale indication to a vehicle operator within the vehicle;

computer readable code for receiving at a telematics device in the vehicle an indication signal signifying the telltale indication;

computer readable code for sending the indication signal to a remote processing center having an advisor that interprets and responds to voice requests that are received by the advisor from different vehicle operators;

computer readable code for establishing communication between the vehicle operator and the advisor at the remote processing center; and computer readable code for thereafter resetting the telltale indication from the remote processing center through the telematics device based on a determination of the advisor.

17. The computer readable medium of claim 16 wherein the computer readable code for establishing communication between the vehicle operator and an advisor comprises one of computer readable code for establishing communication from the vehicle to the remote processing center and computer readable code for establishing communication from the remote processing center to the vehicle.

18. The computer readable medium of claim 16 wherein the computer readable code for resetting the telltale indication from the remote processing center through the telematics device comprises computer readable code for checking vehicle data at the remote processing center and computer readable code for resetting the telltale indication when the vehicle data is normal.

19. The computer readable medium of claim 16 wherein the computer readable code for resetting the telltale indication from the remote processing center through the telematics device comprises computer readable code for scheduling a service appointment date and computer readable code for resetting the telltale indication.

20. A computer readable medium for resetting a telltale from a remote processing center, the computer readable medium comprising:

computer readable code for providing a telltale indication to a vehicle operator within the vehicle;

computer readable code for receiving at a telematics device in the vehicle an indication signal signifying the telltale indication;

computer readable code for sending the indication signal to a remote processing center;

computer readable code for establishing communication between the vehicle operator and an advisor at the remote processing center; and computer readable code for thereafter resetting the telltale indication from the remote processing center through the telematics device, wherein the computer readable code for resetting the telltale indication from the remote processing center through the telematics device comprises computer readable code for scheduling a service appointment date, computer readable code for resetting the telltale indication, and computer readable code for checking vehicle data after the service appointment date.

21. The computer readable medium of claim 20 further comprising computer readable code for initiating an alarm from the remote processing center when the vehicle data is inconsistent with service scheduled for the service appointment date.

* * * * *